(No Model.)
H. A. CROSSLEY.
BRAKE FOR STREET CARS.
No. 489,465. Patented Jan. 10, 1893.
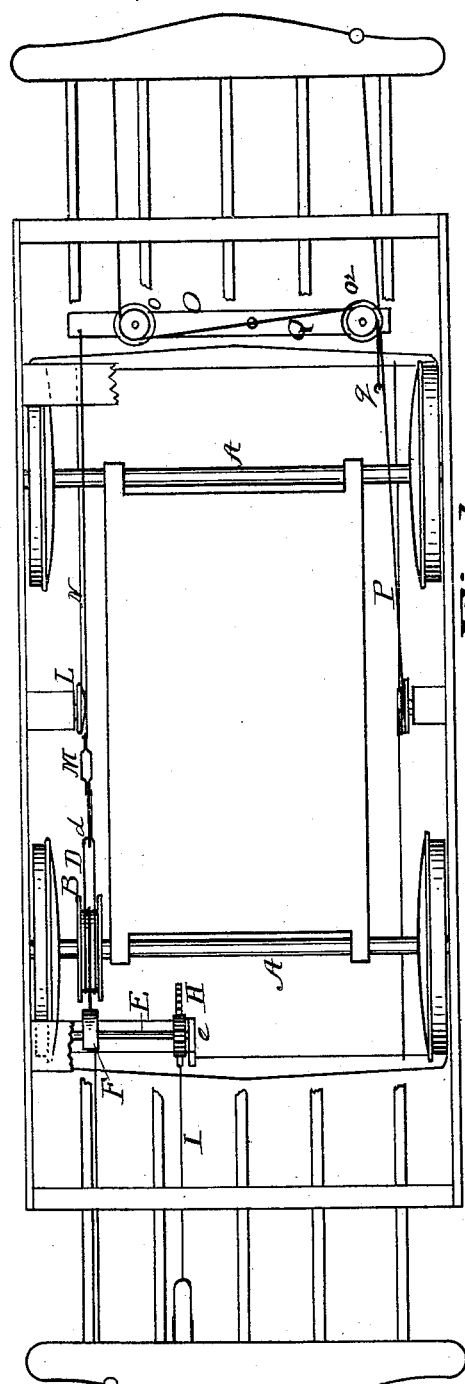
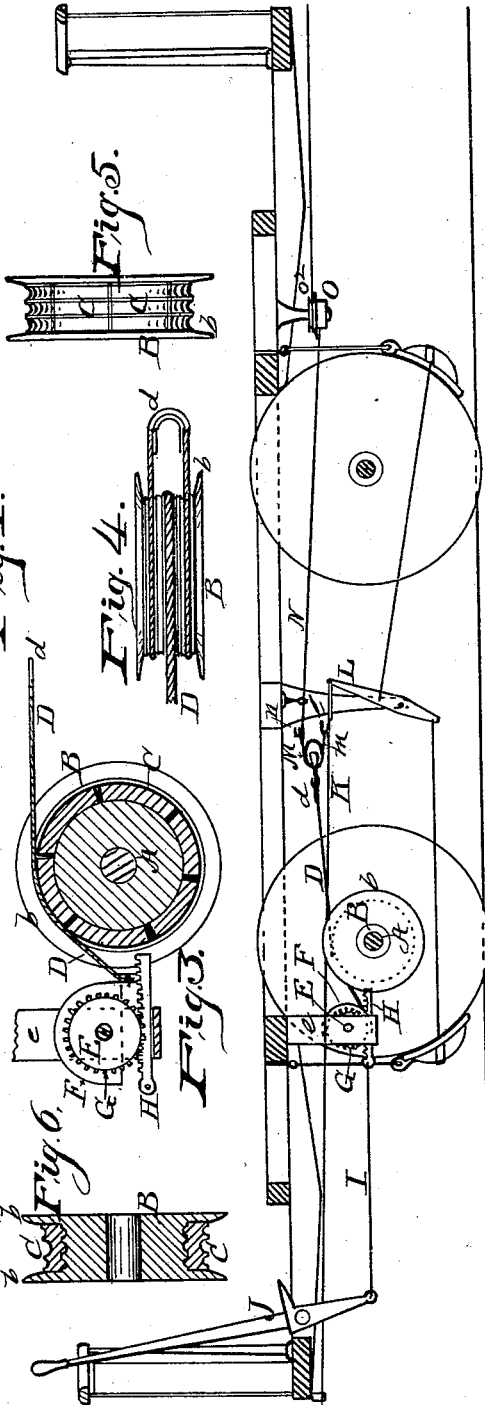
Witnesses:
M. M. Barnes
E. Jay Pinney
Inventor,
Harry A. Crossley.
By Geo. W. Tibbitts Atty.

UNITED STATES PATENT OFFICE.

HARRY A. CROSSLEY, OF CLEVELAND, OHIO.

BRAKE FOR STREET-CARS.

SPECIFICATION forming part of Letters Patent No. 489,465, dated January 10, 1893.

Application filed April 25, 1891. Renewed April 9, 1892. Serial No. 428,427. (No model.)

*To all whom it may concern:*

Be it known that I, HARRY A. CROSSLEY, a citizen of the United States, residing at Cleveland, in the county of Cuyahoga and State of Ohio, have invented certain new and useful Improvements in Brakes for Street-Cars, of which the following is a specification.

This invention relates to brakes for street railway cars, and consists in the novel constructions and combinations of devices, as hereinafter described and pointed out in the claims.

In the accompanying drawings, Figure 1 is a top or plan view of a car truck having my invention attached. Fig. 2 is a longitudinal section of the same. Fig. 3 is a detached sectional view of a friction wheel, showing a rope around the same and a rope tightening mechanism. Fig. 4 is a top edge view of the friction wheel showing manner of applying the rope. Fig. 5 is also an edge view of said wheel showing segmental friction lags around which the rope is wound. Fig. 6 is a sectional view of the same.

A A, are the car axles on one of which is fixed a grooved wheel or drum B, having deep flanges, $b$.

C C, are segments of a ring placed around the body of the wheel or drum, the outer surfaces having grooves.

D is a rope passed part way around the drum in two strands which are united and twisted into one strand. The ends of the two strands are joined and provided with a metal yoke $d$. E is a rock-shaft set in suitable hangers, $e, e$, in front of said drum, and upon said shaft is fixed a half wheel F, to one corner of which is attached the end of the large strand of the rope D. G is a pinion fixed on the said shaft E, and H is a rackbar arranged to slide in a groove in the foot of the hanger $e$, with its rack teeth in engagement with the teeth of the pinion. I is a connecting rod connecting said rack bar H, with the lower end of the hand lever J, at the front end of the car platform, by means of which rotative motion may be applied to the said rockshaft E, and the said half wheel turned to take up the slack of the rope and tighten the same on the drum, when required for setting the brakes.

K is a rod running from the brake lever L forward to the front of the platform and may be attached to the ordinary hand crank lever for setting the brakes by hand when desired. On said rod is provided a hook $l$, to which a chain or cord $m$, is attached passing through a sheave M, the other end of which is caught in a hook $n$ on a rod N, extending to the rear and attached to the end of an equalizing lever O.

P is a rod attached to the brake lever on the opposite side of the car, and extends to the rear platform. Upon the said equalizing lever, O, are provided two sheaves, $o, o^2$.

Q is a cord or chain caught in a hook or loop, $q$, on the rod P, and passes around sheave $o^2$, thence across to and around sheave $o$, thence to the rear of the car where it may be connected with the brake mechanism of a trail car.

The friction wheel may be used without the lags if desired as its periphery is provided with grooves for receiving the rope, the middle groove being made wider than the side grooves to receive the united and enlarged strand of the rope.

From the foregoing the operation of this mechanism is seen to be as follows: When the half wheel F is rotated through the medium of the rack H and pinion G, and the hand lever, the rope D is tightened upon the drum by the taking up of the slack, then by the friction said rope is hauled forward, and the brake mechanism operated for setting the brakes. By reversing the movement of the hand lever, the half wheel is rotated back again, slacking up the rope, relieving the friction, and the brakes are loosened.

Having described my invention I claim—

1. The combination of car axle A, fixed grooved drum B, rope D, rockshaft E, half wheel F, pinion G, rack bar H and means for operating same, substantially as and for the purpose set forth.

2. The combination with car axle A, of drum B having segmental grooved lags, C, C, rope D, composed of two strands, twisted or braided into a united strand and wound around said drum, and connected with a tightening mechanism substantially as and for the purpose set forth.

3. The combination of axle A, drum B, rope D, rockshaft E, half wheel F, pinion G, rack bar H, connected with and operated by hand lever J, the sheave M, cord $m$, rod K attached to brake lever L and having hook $l$, rod N, equalizing lever O, provided with sheaves $o$, $o^2$, chain or cord Q, connected to hook $q$ on rod, P, constructed and arranged to operate substantially as and for the purpose set forth.

HARRY A. CROSSLEY.

Witnesses:
GEO. W. TIBBITTS,
M. G. NORTON.